United States Patent
Murthy et al.

(10) Patent No.: US 12,279,014 B2
(45) Date of Patent: Apr. 15, 2025

(54) PROMOTED CONTENT SELECTION AND DELIVERY IN A TELEVISION PLATFORM

(71) Applicant: GOOGLE LLC, Mountain View, CA (US)

(72) Inventors: Rashmi Murthy, Saratoga, CA (US); Matthew Ross, San Francisco, CA (US); Jimmy Justin Glenn Chua Lo, Dublin, CA (US); Sri Chaitanya Kamisetty, Sunnyvale, CA (US); Kaichi Zhou, Torrance, CA (US); Donato Borrello, Jersey City, NJ (US); Neil Mitan Gandhi, Dublin, CA (US); Igor Fradlis, Woodmere, NY (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 18/183,731

(22) Filed: Mar. 14, 2023

(65) Prior Publication Data
US 2024/0314381 A1    Sep. 19, 2024

(51) Int. Cl.
*H04N 21/458* (2011.01)
*G06Q 30/0251* (2023.01)
(Continued)

(52) U.S. Cl.
CPC ....... *H04N 21/458* (2013.01); *G06Q 30/0271* (2013.01); *H04L 9/3213* (2013.01);
(Continued)

(58) Field of Classification Search
CPC ............... H04N 21/27; H04N 21/2351; H04N 21/2387; H04N 21/25; H04N 21/458; G06Q 30/0271; H04L 9/3213
See application file for complete search history.

(56) References Cited

U.S. PATENT DOCUMENTS

| 10,779,021 B1 | 9/2020 | Demsey et al. |
| 11,445,259 B1 | 9/2022 | Stratton et al. |

(Continued)

FOREIGN PATENT DOCUMENTS

| WO | 2016098058 A1 | 6/2016 |
| WO | 2018197542 A1 | 11/2018 |

OTHER PUBLICATIONS

"Dynamic Ad Insertion for OTT Monetization", Intertrust White Paper, retrieved on Oct. 16, 2022 from https://beth.technology/wp-content/uploads/2018/12/Dynamic-Ad-Insertion-for-OTT-Monetization.pdf, 11 pages.

(Continued)

*Primary Examiner* — Jefferey F Harold
*Assistant Examiner* — Alexander Boyd
(74) *Attorney, Agent, or Firm* — Brake Hughes Bellermann LLP

(57) ABSTRACT

In some aspects, a method includes executing a streaming application configured to stream a media content item on a display of a television device, and receiving, from the streaming application, a request to generate a token. The method includes, in response to the request, obtaining a user identifier of a user account of a media platform, obtaining a plurality of signals used to select promoted content for the user account, generating the token to include the user identifier and the plurality of signals, and encrypting the token to generate an encrypted token. The encrypted token is configured to be included in a fetch request to retrieve a promoted content item, personalized to the user account, from a promoted content server associated with the media platform. The promoted content item is configured to be inserted into playback of the media content item by the streaming application.

22 Claims, 11 Drawing Sheets

(51) Int. Cl.
  *H04L 9/32* (2006.01)
  *H04N 21/235* (2011.01)
  *H04N 21/2387* (2011.01)
  *H04N 21/25* (2011.01)
  *H04N 21/27* (2011.01)

(52) U.S. Cl.
  CPC ..... *H04N 21/2351* (2013.01); *H04N 21/2387* (2013.01); *H04N 21/25* (2013.01); *H04N 21/27* (2013.01)

(56) References Cited

U.S. PATENT DOCUMENTS

| | | |
|---|---|---|
| 2010/0049567 A1 | 2/2010 | Ahanger et al. |
| 2012/0240151 A1 | 9/2012 | Tapper |
| 2015/0382042 A1 | 12/2015 | Wagenaar et al. |
| 2020/0204279 A1* | 6/2020 | Lykes .................. H04N 21/812 |
| 2021/0090126 A1* | 3/2021 | Schobeiri ........... G06Q 30/0269 |
| 2022/0086533 A1 | 3/2022 | Marshall et al. |
| 2022/0201369 A1* | 6/2022 | McClendon ... H04N 21/234345 |
| 2022/0286724 A1* | 9/2022 | Whittaker ........ H04N 21/25816 |
| 2024/0056621 A1* | 2/2024 | Latham .............. G06Q 30/0261 |

OTHER PUBLICATIONS

"Inventory Partner Domain Sharing forConnected TV Apps", Blog, retrieved on Oct. 17, 2022 from https://42matters.com/blog/?p=iabs-app-adstxt-inventory-partner-domain-for-connected-tv-apps, Oct. 20, 2021, 3 pages.

"PAL SDK for IOS, Ad Manager API, and Youtube Ad Campaigns Target TV Screens by Default", Google Developers, retrieved on Oct. 16, 2022 from https://developers.google.com/ad-manager/pal/ios, Oct. 16, 2022, 33 pages.

International Search Report and Written Opinion for PCT Application No. PCT/US2024/019988, mailed on Jun. 19, 2024, 13 pages.

* cited by examiner

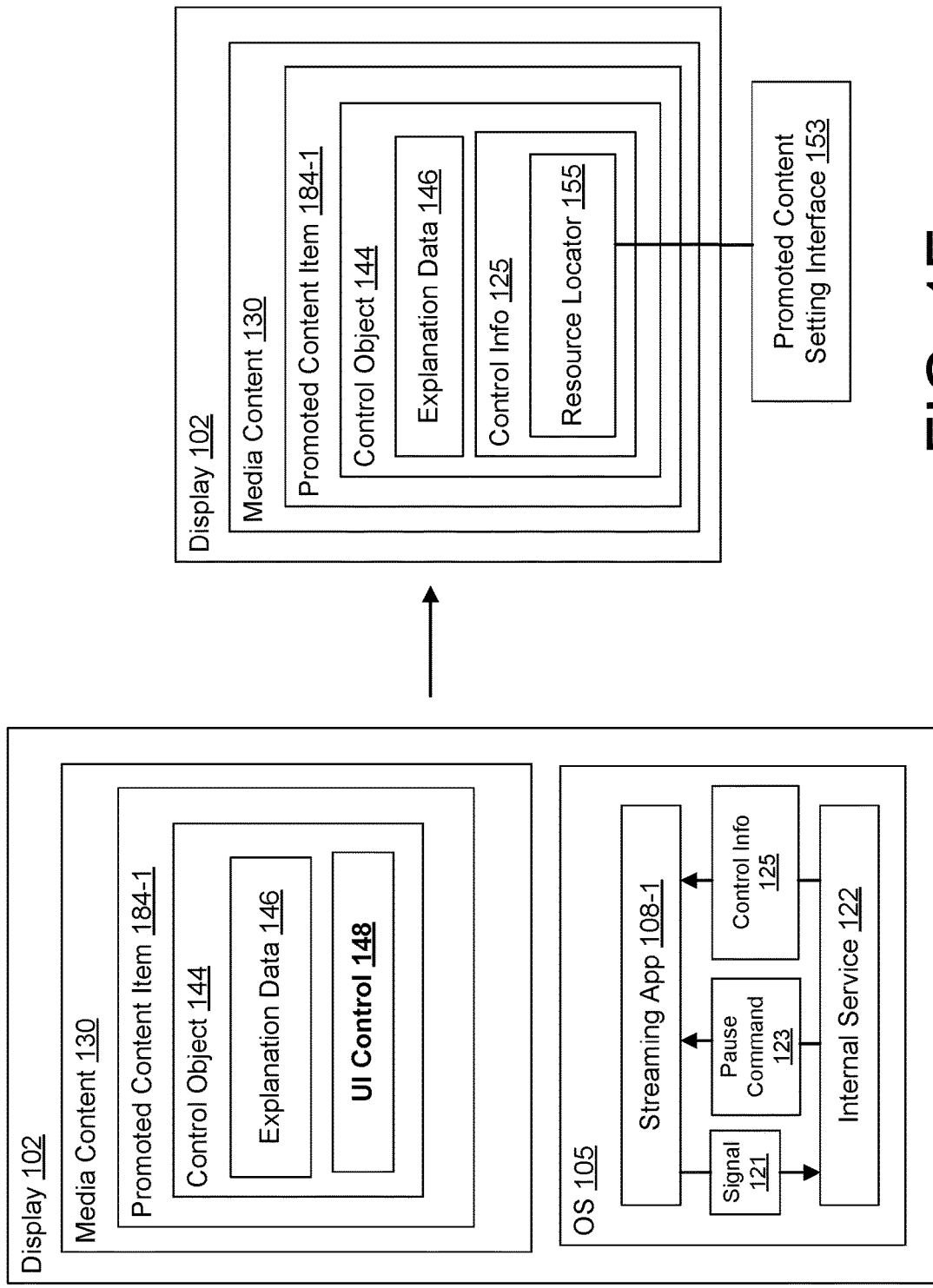

US 12,279,014 B2

PROMOTED CONTENT SELECTION AND DELIVERY IN A TELEVISION PLATFORM

BACKGROUND

A device such as a television device may execute a streaming application configured to stream media content (e.g., a show, movie, live broadcast, etc.) to the television device and the streaming application may insert promoted content items during the playback of the media content. The selection of promoted content items (e.g., which ads to display) may be controlled by a first promoted content server associated with the streaming application. However, the streaming application may be required to share the promoted content inventory with a second promoted content server, where the second promoted content server may select personalized promoted content from its promoted content inventory. However, there are technical challenges associated with distributing the control of promoted content selection between promoted content servers, where one of the promoted content servers provides personalized promoted content.

SUMMARY

In some aspects, a method includes executing, by an operating system of a television device, a streaming application configured to stream a media content item on a display of the television device, and receiving, from the streaming application, a request to generate a token. The method includes, in response to the request, obtaining a user identifier of a user account of a media platform, obtaining a plurality of signals used to select promoted content for the user account, generating the token to include the user identifier and the plurality of signals, and encrypting the token to generate an encrypted token. The encrypted token is configured to be included in a fetch request to retrieve a promoted content item, personalized to the user account, from a promoted content server associated with the media platform. The promoted content item is configured to be inserted into playback of the media content item by the streaming application.

In some aspects, a non-transitory computer-readable medium stores executable instructions that when executed by at least one processor cause the at least one processor to execute operations. The operations includes receiving a fetch request to retrieve a promoted content item, the fetch request including an encrypted token, the encrypted token including a user identifier of a user account of a media platform and a plurality of signals used to select promoted content for the user account, selecting a first promoted content server from a plurality of promoted content servers, the plurality of promoted content servers including the first promoted content server and a second promoted content server, the first promoted content server being associated with the media platform, the second promoted content server being associated with a streaming application, transmitting the fetch request to the first promoted content server, the fetch request configured to cause the first promoted content server to retrieve a media content item, personalized to the user account, using the user identifier and the plurality of signals, and receiving a promoted content response from the first promoted content server, the promoted content response identifying the promoted content item and including metadata about the promoted content item.

In some aspects, a television device includes at least one processor; and a non-transitory computer-readable medium storing executable instructions that when executed by the at least one processor cause the at least one processor to execute, by an operating system of the television device, a streaming application configured to stream a media content item on a display of the television device, receive, from the streaming application, a request to generate a token; in response to the request, obtain a user identifier of a user account of a media platform, obtain a plurality of signals used to select promoted content for the user account, generate the token to include the user identifier and the plurality of signals, and encrypt the token to generate an encrypted token, the encrypted token configured to be included in a fetch request to retrieve a promoted content item, personalized to the user account, from a promoted content server associated with the media platform, the promoted content item configured to be inserted into playback of the media content item by the streaming application.

The details of one or more implementations are set forth in the accompanying drawings and the description below. Other features will be apparent from the description and drawings, and from the claims.

BRIEF DESCRIPTION OF THE DRAWINGS

FIG. 1D illustrates an example of a control object according to an aspect.

FIG. 1E illustrates an example of a control object according to another aspect.

DETAILED DESCRIPTION

Figure 1A:
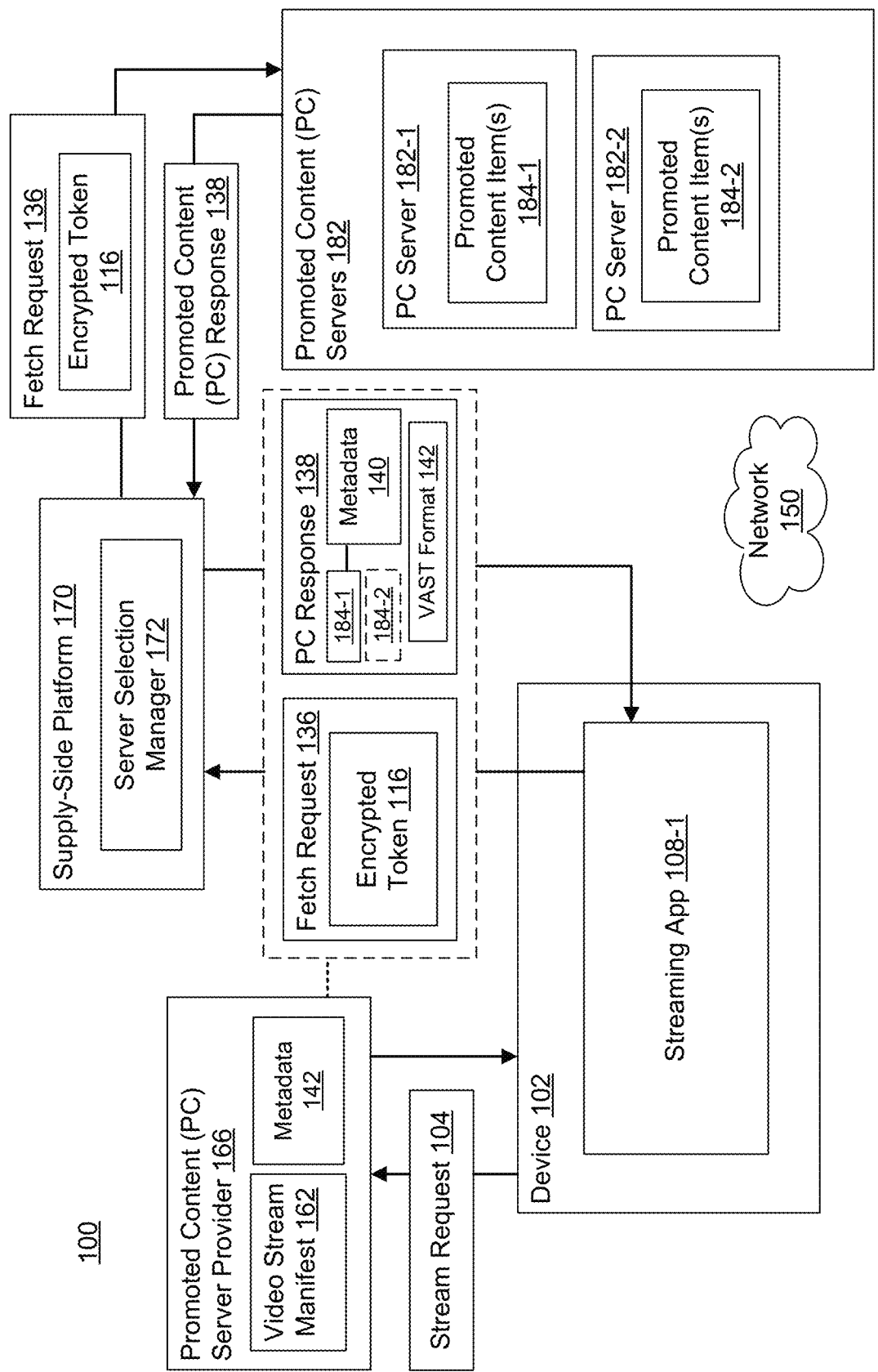
FIG. 1A illustrates a system that enables the sharing of promoted content inventory between multiple promoted content servers according to an aspect.

This disclosure relates to a system that enables the sharing of promoted content inventory from multiple sources for a media content item streamed from a streaming application of a device (e.g., a television device). The system may include a first promoted content server associated with the streaming application, and the first promoted content server may select promoted content items (e.g., ads) such that the promoted content items are rendered by the streaming application when the media content item is selected for playback. The streaming platform may be required to share the promoted content inventory with a different promoted content server (e.g., a second promoted content server) when the streaming application executes on the operating system of the device. The second promoted content server, associated with the operating system, may select personalized promoted content.

The device's operating system is configured to enable the streaming application and the operating system to communicate with each via one or more application programming interface(s) to retrieve and generate information for a fetch request that is securely routed to either the first promoted content server or the second promoted content server. The fetch request, when executed at the second promoted content server, selects one or more promoted content items that are personalized to the user account of the operating system.

In further detail, the operating system may receive a request to generate a token from the streaming application. In some examples, the streaming application may receive a selection to playback the media content item, and, in response to the selection to playback the media content item, the operating system may receive the request to generate the token. In response to the request, the operating system may obtain a user identifier. In some examples, the user identifier relates a user account of a media platform configured to provide content in a user interface of the device. Also, in response to the request, the operating system may obtain a plurality of signals used to select promoted content for the user account by the second promoted content server. The operating system may generate a token that includes the user identifier and the plurality of signals. The operating system may encrypt the token to generate an encrypted token. The encrypted token is configured to be included in a fetch request to retrieve a promoted content item, personalized to the user account, from the second promoted content server, where the promoted content item is configured to be inserted into the playback of the media content item.

In some examples, the system uses a server-side promoted ad insertion (SSAI) mechanism in which a promoted content server provider retrieves a video stream manifest from the streaming platform and promoted content items selected by the first and second promoted content servers. The video stream manifest may include the media content of the media content item. The promoted content server provider may adjust the video stream manifest to identify the locations in the timeline of the video stream to insert the appropriate promoted content items selected by the first and second promoted content servers. The streaming application may receive the video stream manifest from the promoted content server provider and display the promoted content items at the times specified by the video stream manifest.

In some examples, the system uses a client-side ad insertion (CSAI) mechanism in which the streaming application retrieves a promoted content item from one of the promoted content servers and inserts the promoted content item into the video stream. For example, after playback of the media content is initiated, the streaming application may detect a promoted content insertion event, e.g., a point in the video stream to insert promoted content. Upon detection of a promoted content insertion event, the streaming application may generate and transmit a token request to the token generator via the APIs. In response to the token request, the token generator may generate the encrypted token and transmit the encrypted token back to the streaming application.

Also, during the display of the promoted content item, the streaming application may render a control object that provides information and/or control(s) about the promoted content item. In some examples, the control object includes an ads transparency and controls (ATC) menu. In some examples, the operating system is configured to enable the streaming application and the operating system to communicate with each via the API(s) to control interactions with the control object. In some examples, the operating system may receive a signal that indicates user interaction with the control object rendered on the promoted content item. In some examples, in response to the signal, the operating system may generate a pause command to cause the streaming application to pause playback of the promoted content item. In some examples, in response to the signal, the operating system may transmit control information to the streaming application to be rendered in the control object. In some examples, the control information includes a resource locator associated with a promoted content setting interface. In some examples, the resource locator includes a machine-readable barcode (e.g., a quick response (QR) code.

FIGS. 1A through 1E illustrate a system 100 configured to enable the sharing of promoted content from multiple promoted content servers 182 for media content 130 rendered by a streaming application 108-1 executable by an operating system 105 of a device 102. In some examples, the device 102 is a television device (e.g., a smart television). The system 100 may include a promoted content server 182-2 associated with the streaming application 108-1. In some examples, the promoted content server 182-2 is referred to as an ad server. The promoted content server 182-2 may select promoted content items 184-2 (e.g., ads) such that the promoted content items 184-2 are rendered by the streaming application 108-1 when a media content item 128-1 is selected for playback. In some examples, the media content item 128-1 may include an advertising-based video on demand (AVOD) file hosted by a corresponding streaming platform 160-1. The streaming platform 160-1 may be required to share the promoted content inventory with a different promoted content server (e.g., promoted content server 182-1) when the streaming application 108-1 executes on the operating system 105. The promoted content server 182-1, associated with the operating system 105, may select personalized promoted content. The promoted content server 182-1 may be referred to as an ad server. In some examples, ad is an example of promoted content.

When media content 130 of the media content item 128-1 is rendered by the streaming application 108-1, the system 100 is configured to provide a secure ads framework that enables the display of promoted content item(s) 184-1 selected by the promoted content server 182-1 and the display of promoted content item(s) 184-2 selected by the promoted content server 182-2 in which the promoted content item(s) 184-1 are personalized to a user account 104 of the user. The operating system 105 is configured to enable streaming application(s) 108 and the operating system 105 to communicate with each (e.g., via one or more application programming interface(s) 112) to retrieve and generate information for a fetch request 136 that is securely routed to either the promoted content server 182-1 or the promoted content server 182-2. The fetch request 136, when executed at the promoted content server 182-1, selects one or more promoted content items 184-1 that are personalized to the user account 104. The promoted content item(s) 184-1 are configured to be displayed before, during, or after the media content 130 is played back.

For example, the operating system 105 may receive a request to generate an encrypted token 116 from the streaming application 108-1. In some examples, the streaming application 108-1 may receive a selection to playback the media content item 128-1, and, in response to the selection to playback the media content item 128-1, the operating system 105 may receive the request to generate the encrypted token 116. In some examples, the streaming application 108-1 may detect a position in the video stream of the media content item 128-1 to insert promoted content (e.g., before, during or after the rendering of the media content 130), and, in response to the detected position, the operating system 105 may receive the request to generate the encrypted token 116. In response to the request, the operating system 105 may obtain a user identifier 118. Also, in response to the request, the operating system 105 may obtain a plurality of signals 120 used to select promoted content for the user account 104. The operating system 105 may generate a token 116*a* (e.g., an unencrypted version) that includes the user identifier 118 and the plurality of signals 120. The operating system 105 may encrypt the token 116*a* to generate the encrypted token 116. The encrypted token 116 is configured to be included in a fetch request 136 to retrieve a promoted content item 184-1, personalized to the user account 104, from the promoted content server 182-1, where the promoted content item 184-1 is configured to be inserted into the playback of the media content item 128-1.

Also, during the playback of the promoted content item 184-1, the streaming application 108-1 may render a control object 144 that provides information and/or control(s) about the promoted content item 184-1. In some examples, the control object 144 includes an ads transparency and controls (ATC) menu. In some examples, the operating system 105 is configured to enable the streaming application 108-1 and the operating system 105 to communicate with each via the API(s) 112 to control interactions with the control object 144. In some examples, the operating system 105 may receive a signal 121 that indicates user interaction with the control object 144 rendered on (or with respect to) the promoted content item 184-1. In some examples, in response to the signal 121, the operating system 105 may generate a pause command 123 to cause the streaming application 108-1 to pause playback of the promoted content item 184-1. In some examples, in response to the signal 121, the operating system 105 may transmit the control information 125 to the streaming application 108-1 to be rendered in the control object 144. In some examples, the control information 125 includes a resource locator 155 associated with a promoted content setting interface 153.

The device 102 may be a network-enabled display device configured to connect to the network 150. The device 102 may be any type of user device such as a smartphone, tablet, laptop, wearable device, television, etc. In some examples, the device 102 is a television device (e.g., a smart television). The device 102 includes one or more processors 101, one or more memory devices 103, and an operating system 105 configured to execute (or assist with executing) native applications. A native application is a software program that is developed for use on a particular platform or device, or for a particular operating system. In some examples, the native application is a software program that is developed for multiple platforms or devices. In some examples, the native applications include a media aggregator application 106, and one or more streaming applications 108. In some examples, the media aggregator application 106 is a program that is part of the operating system 105, and therefore any operations discussed with reference to the media aggregator application 106 may be executed by the operating system 105. In some examples, the media aggregator application 106 is a separate standalone application that is downloaded and installed on the operating system 105. In some examples, the device 102 is not a smart television, but is converted to a smart television when connected to a casting device, where the casting device is configured to connect to the network 150 and execute the operating system 105, including the streaming applications 108 and the media aggregator application 106.

In some examples, the operating system 105 is a browser application. A browser application is a web browser configured to access information on the Internet and may launch one or more browser tabs in the context of one or more browser windows. In some examples, the operating system 105 is a Linux-based operating system. In some examples, the operating system 105 is a mobile operating system that is also configured to execute on smaller devices (e.g., smartphones, tablets, wearables, etc.).

The streaming applications 108 may include a streaming application 108-1 and a streaming application 108-2. The streaming application 108-1 may be launched on the operating system 105 which renders a user interface 126 to enable the user to select and stream a media content item 128-1 that is available on a streaming platform 160-1. The streaming application 108-2 may be launched on the operating system 105 which renders a user interface 126 to enable the user to stream a media content item 128-2 that is available on a streaming platform 160-2. Displaying a media content item 128 in the user interface 126 may include displaying UI element(s) (e.g., icon) in the user interface 126 that identifies a corresponding media content item 128 along with information about the media content item 128 (e.g., title, description, underlying streaming platform 160, etc.).

A media content item 128 may correspond to a digital video file, which may be stored on a streaming platform 160 (including a media platform 152) and/or the device 102. A media content item 128 may be a program, television show, a movie, a live broadcast, etc. The digital video file may include video and/or audio data that corresponds to the particular media content item. Streaming (or playback) of a media content item 128 (and/or the displaying of media content 130 of a media content item 128) may refer to the transmission of the contents of a video file from the location of the video file (e.g., the streaming platform 160) to the device 102 that displays the contents (e.g., the media content 130) of the video file. In some examples, streaming (or playback) of a media content item (and/or the displaying of media content 130 of a media content item 128) may refer to a continuous video stream that is transferred from one place to another place in which a received portion of the video stream is displayed while waiting for other portions of the video stream to be transferred (e.g., transferred across the network 150).

In some examples, instead of locating the media content item 128 from the individual native applications, the user may use the media aggregator application 106 to search for media content items 128 across various streaming platforms 160. The media aggregator application 106 (e.g., in conjunction with a media platform 152) may aggregate (e.g., combine, assemble, collect, etc.) information about media content items 128 available for viewing (e.g., streaming) from multiple streaming platforms 160 and present the information in a user interface 126 (e.g., a single, unified user interface) so that a user can identify and/or search media content items 128. Depending on the context, the user interface 126 may be associated with the streaming application 108-1, the streaming application 108-2, or the media aggregator application 106.

The media platform 152 may communicate, over a network 150, with the streaming platforms 160 to identify which media content items 128 are available to be streamed by the device 102 and identify a set or multiple sets of media content items 128 (e.g., across the various streaming platforms 160) as recommendations to a user of the media aggregator application 106. In some examples, the media platform 152 may determine whether the user of the media aggregator application 106 has rights (e.g., entitlements) to stream media content items 128 from one or more of the streaming platforms 160 (e.g., whether the user has subscribed to access media content from the streaming platform(s) 160), and, if so, may include those media content items 128 as candidates in a selection (e.g., ranking) mechanism to potentially be displayed in the user interface 126. As such, the user may view the media content item 128-1 and the media content item 128-2 from a single interface and select one of the media content items 128 for playback.

When browsing media content items 128 in the media aggregator application 106, the user may identify and select the media content item 128-1 (e.g., select a selectable icon associated with the media content item 128-1), associated with the streaming platform 160-1, which may cause the underlying streaming application 108-1 to be launched on the device 102 and playback of the media content item 128-1 may be initiated from the user interface of the streaming application 108-1. In other words, selection of the media content item 128-1 from the media aggregator application 106 may cause the media aggregator application 106 to launch the streaming application 108-1 (e.g., using a content deep link), which the user can control to start the playback of the media content item 128-1 from the streaming application 108-1.

Figure 1B:
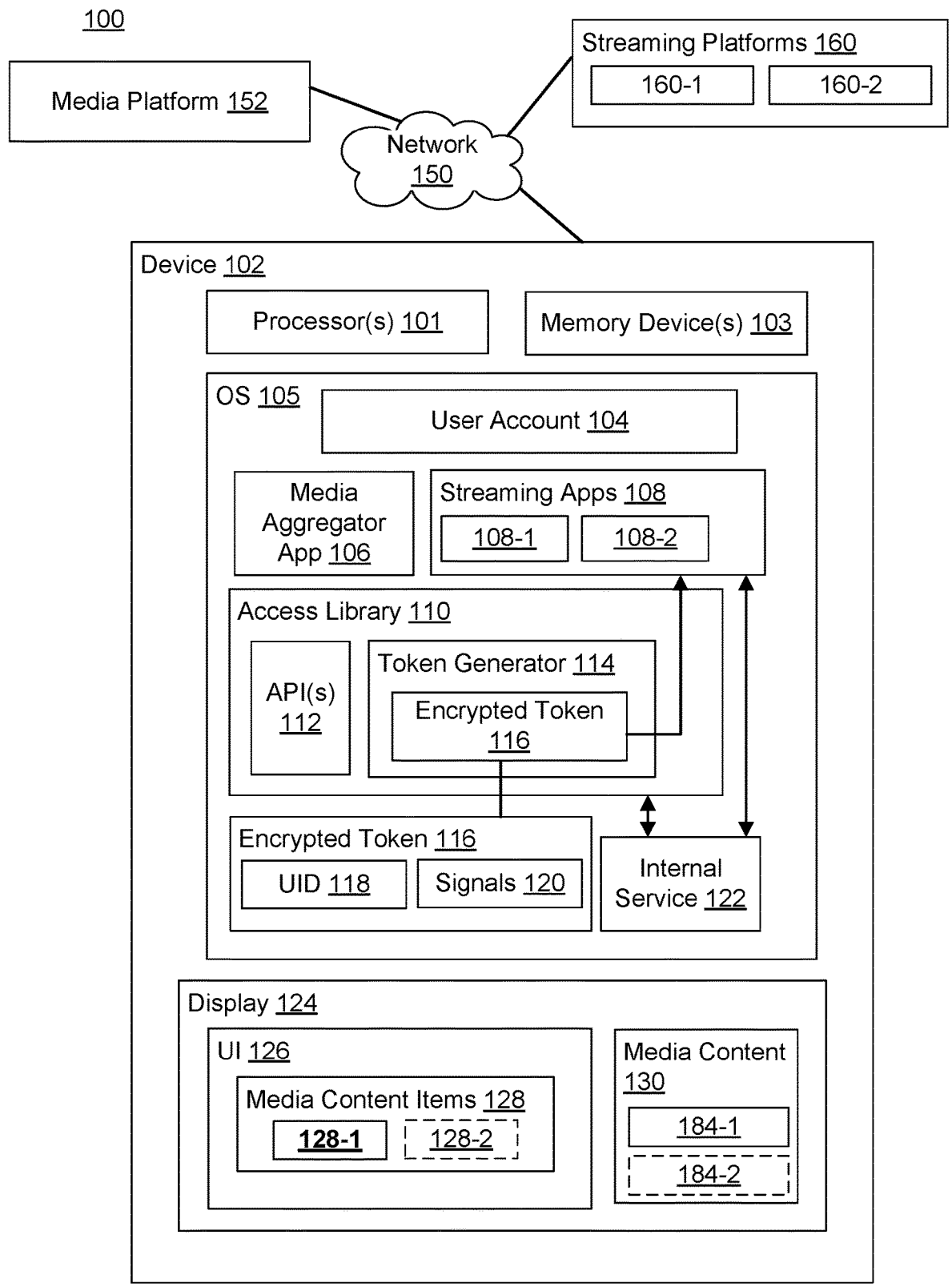
FIG. 1B illustrates an example of a device according to an aspect.

As shown in FIG. 1B, the operating system 105 may include an access library 110. The access library 110 may define one or more application programming interface(s) that enable a streaming application 108 (e.g., the streaming application 108-1) to communicate with the operating system 105 to implement the ads framework discussed herein (e.g., enable the sharing of promoted content from multiple promoted content servers 182). In some examples, the access library 110 may include a token generator 114 configured to generate an encrypted token 116 that is routed to the promoted content server 182-1 or the promoted content server 182-2.

The streaming application 108-1 may use the APIs 112 to communicate with the token generator 114 to obtain the encrypted token 116. The streaming application 108-1 may generate and transmit a token request to the token generator 114 via the APIs 112. In response to the token request, the token generator 114 may generate the encrypted token 116 and transmit the encrypted token 116 back to the streaming application 108-1.

In some examples, the system 100 uses a server-side ad insertion (SSAI) mechanism in which a promoted content server provider 166 retrieves a video stream manifest 162 from the streaming platform 160-1 and promoted content items 184-1, 184-2 selected by the promoted content servers 182. The video stream manifest 162 may include the media content 130 of the media content item 128-1. The promoted content server provider 166 may adjust the video stream manifest 162 to identify the locations in the timeline of the video stream to insert the appropriate promoted content items 184-1, 184-2. The streaming application 108-1 may receive the video stream manifest 162 from the promoted content server provider 166 and display the promoted content items 184-1, 184-2 at the times specified by the video stream manifest 162. In some examples, after playback of the media content item 128-1 initiated by the streaming application 108-1, the streaming application 108-1 may transmit the request for the encrypted token 116, and the encrypted token 116 is used in a single fetch request 136 to retrieve all the promoted content items for the duration of the playback.

In some examples, the system 100 uses a client-side ad insertion (CSAI) mechanism in which the streaming application 108-1 retrieves a promoted content item (e.g., promoted content item 184-1 or promoted content item 184-2) from one of the promoted content servers 182 and inserts the promoted content item into the video stream (e.g., the media content 130). For example, after playback of the media content item 128-1 is initiated, the streaming application 108-1 may detect a promoted content insertion event, e.g., a point in the video stream (e.g., the media content 130) to insert promoted content. Upon detection of a promoted content insertion event, the streaming application 108-1 may generate and transmit a token request to the token generator 114 via the APIs 112. In response to the token request, the token generator 114 may generate the encrypted token 116 and transmit the encrypted token 116 back to the streaming application 108-1. The encrypted token 116 is used in a fetch request 136 to retrieve a promoted content item 184-1 or 184-2, and the streaming application 108-1 inserts the promoted content item 184-1 or 184-2 into the video stream (e.g., the media content 130). Then, upon detection of a subsequent promoted content insertion event, the streaming application 108-1 requests and retrieves the encrypted token 116, which is routed to a promoted content server 182 in a subsequent fetch request 136.

In response to the request to retrieve an encrypted token, the token generator 114 may obtain a user identifier 118 associated with the user account 104. In some examples, the user account 104 is an account associated with the operating system 105. In some examples, the user account 104 is an account associated with a browser application. In some examples, the user account 104 is an account associated with the media platform 152. In some examples, the access library 110 and/or the token generator 114 may communicate with an internal service 122 (e.g., a sub-component of the operating system 105) and the internal service 122 may obtain the user identifier 118 and transfer the user identifier 118 back to the token generator 114.

The token generator 114 may obtain one or more signals 120 used to select one or more promoted content items 184-1 by the promoted content server 182-1. In some examples, the signals 120 are generated by the operating system 105 based on the user's activity of the device 102. In some examples, the signals 120 are generated by one or more server computers. In some examples, the signals 120 include a combination of operating system signals and server-based signals. The signals 120 may include signals related to a user's browser history, viewing history (e.g., which media content items 128) were watched, user's preferences and settings, etc. The signals 120 may include signals about the applications, browsers, and/or devices that a user uses to access services associated with the user account 104. In some examples, the signals 120 include signals relating to search terms (e.g., terms submitted to the media platform 152 by the user for searching across media content items 128), videos watched by the user (e.g., media content items 128 that are played back by the user), views and interactions with promoted content (e.g., promoted content items), voice and/or audio information (e.g., a voice command or voice query provided to the media aggregator application 106), purchase activity (e.g., purchasing a media content item 128), activity on third-party sites and applications that use services provided by the media platform 152 and/or operating system 105, and/or a browsing history of a browser application also associated with the user account 104.

Further to the descriptions above, a user may be provided with controls allowing the user to make an election as to both if and when the system 100 described herein may enable collection of user information (e.g., the signals 120) and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Also, the user may be able to control certain settings and controls regarding promoted content via a promoted content setting interface 153, which may also include a control that can activate or deactivate personalized promoted content. Thus, the user may have control over what information is collected about the user, how that information is used, and what information is provided to the user.

Figure 1C:
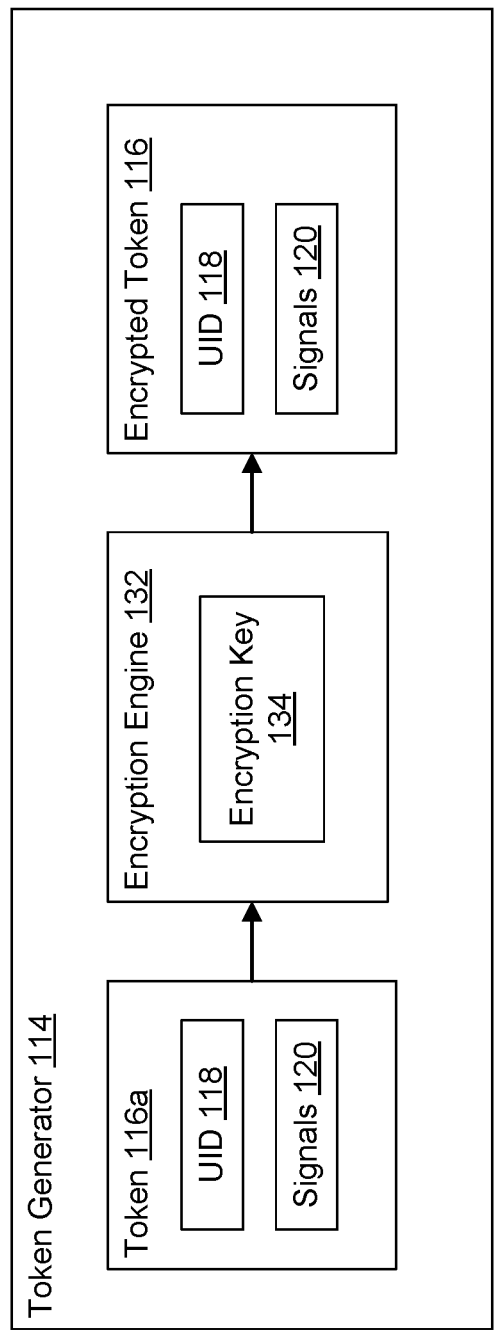
FIG. 1C illustrates an example of a token generator executable by an operating system of the device according to an aspect.

As shown in FIG. 1C, the token generator 114 may generate a token 116a based on the user identifier 118 and the signals 120. The token 116a may be a computer object that includes data representing the user identifier 118 and the signals 120. The token generator 114 may include an encryption engine 132 configured to encrypt the token 116a to generate the encrypted token 116. In some examples, the encryption engine 132 may encrypt the token 116a using an encryption key 134 to generate the encrypted token 116. In some examples, the encryption key 134 is stored in the memory device 103 of the operating system 105, and, in some examples, the encryption key 134 is only available to the token generator 114.

After the token generator 114 generates the encrypted token 116, the token generator 114 may transmit the encrypted token 116 to the streaming application 108-1 via the APIs 112. In some examples, the steaming application 108-1 may generate and transmit a fetch request 136 to a supply-side platform 170 (e.g., in the case of client-side insertion). The fetch request 136 is a request to retrieve promoted content from a promoted content server 182. The fetch request 136 includes the encrypted token 116.

The supply-side platform 170 may be an advertising technology platform used to coordinate and manage the supply and distribution of promoted content inventories. The supply-side platform 170 may include a server selection manager 172. The server selection manager 172 may receive, over the network 150, the fetch request 136 and determine which promoted content server 182 to route the fetch request 136. In other words, the server selection manager 172 may determine which promoted content inventory to use for the fetch request 136. As indicated above, the promoted content server 182-2 may be associated with the streaming platform 160-1, and the promoted content server 182-1 may be associated with an entity that is different from the streaming platform 160-1 (e.g., an entity associated with the operating system 105 and/or the media platform 152). In some examples, the streaming platform 160-1 may have a contract with the entity associated with the operating system 105, where the entity associated with the operating system 105 may obtain a certain percentage of promoted content for a media content item 128 that is streamed from a streaming application 108 that also executes on the operating system 105. In some examples, the server selection manager 172 includes logic that determines whether (or how much of) the promoted content for the media content item 128-1 is selected from the inventory of promoted content items 184-1 provided by the promoted content server 182-1 or the inventory of promoted content items 184-2 provided by the promoted content server 182-2.

If the server selection manager 172 selects the promoted content server 182-1, the supply-side platform 170 may transmit the fetch request 136 with the encrypted token 116 to the promoted content server 182-1. The promoted content server 182-1 may derive the encrypted token 116 from the fetch request 136 and decrypt the encrypted token 116 to obtain the user identifier 118 and the signals 120. The promoted content server 182-1 may use the user identifier 118 and the signals 120 to select one or more promoted content items 184-1 from the promoted content inventory of the promoted content server 182-1. The promoted content server 182-1 may transmit a promoted content response 138 to the supply-side platform 170. In some examples, the supply-side platform 170 may transmit the promoted content response 138 to the streaming application 108-1 (e.g., in the case of client-side insertion). The promoted content response 138 may include or identify the promoted content item 184-1 to be inserted into the media content 130. The promoted content item 184-1 may be a video stream that is inserted into the media content 130 of the media content item 128. The promoted content response 138 may include metadata 140 about the promoted content item 184-1 that is used to display information in a control object 144 in the display 124. In some examples, the promoted content response 138 includes a video ad serving template (VAST) format 142. A VAST format 142 may be an XML standard for delivering promoted content for video. In some examples, the promoted content response 138 is considered as a VAST response.

If the server selection manager 172 selects the promoted content server 182-2, the supply-side platform 170 may transmit the fetch request 136 with the encrypted token 116 to the promoted content server 182-2. The promoted content server 182-2 may not be able to decrypt the encrypted token 116. In some examples, the promoted content server 182-2 may discard the encrypted token 116 and select one or more promoted content items 184-2 from the inventory of promoted content provided by the promoted content server 182-2 based on the promoted content server's own logic for promoted content selection. The promoted content server 182-2 may transmit a promoted content response 138 to the supply-side platform 170. In some examples, the supply-side platform 170 may transmit the ad response 138 to the streaming application 108-1 (e.g., in the case of client-side insertion). The promoted content response 138 generated by the promoted content server 182-2 may include or identify the promoted content item 184-2 to be inserted into the media content 130 by the streaming application 108-1. In some examples, the promoted content response 138 does not include the metadata 140 about the promoted content item 184-2.

In some examples, the streaming application 108-1 may transmit the encrypted token 116 to a promoted content server provider 166 associated with the streaming platform 160-1. In some examples, the promoted content server provider 166 may generate the fetch request 136 with the encrypted token 116. In some examples, the fetch request 136 is a request to retrieve all promoted content items for the media content item 128-1. The promoted content server provider 166 may transmit the fetch request 136 to the supply-side platform 170, and the supply-side platform 170 may select the promoted content server 182-1 and/or the promoted content server 182-2 to route the fetch request 136. The supply-side platform 170 may receive the promoted content response 138 and transmit the promoted content response 138 to the promoted content server provider 166. The promoted content server provider 166 may adjust the video stream manifest 162 to identify the locations in the timeline of the video stream to insert the appropriate promoted content items 184-1, 184-2 from the promoted content response 138. The promoted content server provider 166 may transmit the video stream manifest 162 to the streaming application 108-1, where the streaming application 108-1 may display the promoted content items 184-1, 184-2 at the times specified by the video stream manifest 162 on the display 124. In some examples, the promoted content server provider 166 may derive the metadata 140 from the promoted content response 138 and transmit the metadata 140 to the streaming application 108-1.

As shown in FIGS. 1D and 1E, during the playback of the promoted content item 184-1 on the display 124, the streaming application 108-1 may render a control object 144 that provides information and/or control(s) about the promoted content item 184-1. In some examples, the control object 144 includes an ads transparency and controls (ATC) menu. In some examples, the streaming application 108-1 may use the metadata 140 included in the promoted content response 138 (or received from the promoted content server provider 166) to populate the control object 144. The control object 144 may include explanation data 146 about the promoted content item 184-1. The explanation data 146 may include information on why the user is viewing the promoted content item 184-1. In some examples, the explanation data 146 is defined by the metadata 140 included in the promoted content response 138 (or received from the promoted content server provider 166). The control object 144 may include a UI control 148, which, when selected, causes an action to be initiated with response to promoted content and/or cause the display of further information regarding the promoted content on the display 124. In some examples, the operating system 105 is configured to enable streaming application 108-1 and the operating system 105 to communicate with each via the API(s) 112 to control interactions with the control object 144.

In response to the UI control 148 being selected, the streaming application 108-1 may transmit a signal 121 via the API(s) 112 to the internal service 122 of the operating system 105. The signal 121 may be an indication that the user has selected the UI control 148. In response to the signal 121, the internal service 122 may generate and transmit a pause command 123 via the API(s) 112 to the streaming application 108-1 causing the streaming application 108-1 to pause playback of the promoted content item 184-1. In some examples, in response to the signal 121, the internal service 122 may transmit control information 125 to the streaming application 108-1 via the API(s) 112 such that the control information 125 is rendered in the control object 144. In some examples, the control information 125 includes a resource locator 155 associated with a promoted content setting interface 153. In some examples, the resource locator 155 includes a machine-readable barcode (e.g., a QR code) configured to be interpreted by the user's mobile device. In some examples, the resource locator 155 includes a selectable uniform resource locator (URL), which, when selected, causes the promoted content setting interface 153 to be displayed on the display 124.

The processor(s) 101 may be formed in a substrate configured to execute one or more machine executable instructions or pieces of software, firmware, or a combination thereof. The processor(s) 101 can be semiconductor-based-that is, the processors can include semiconductor material that can perform digital logic. The memory device(s) 103 may include a main memory that stores information in a format that can be read and/or executed by the processor(s) 101. The memory device(s) 103 may include one or more random-access memory (RAM) devices and/or one or more read-only memory (ROM) devices. The memory device(s) 103 may store applications (e.g., the operating system 105 (including sub-components of the operating system 105), native applications, including the media aggregator application 106, the streaming applications 108) that, when executed by the processors 101, perform certain operations.

The promoted content server provider 166, the supply-side platform 170, the promoted content servers 182, the media platform 152, and the streaming platforms 160 may be executable by server computers. A server computer may be computing devices that take the form of a number of different devices, for example a standard server, a group of such servers, or a rack server system. In some examples, a server computer may be a distributed system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections. The server computer may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer. The server computer may include one or more modules or engines representing specially programmed software.

Figure 2:
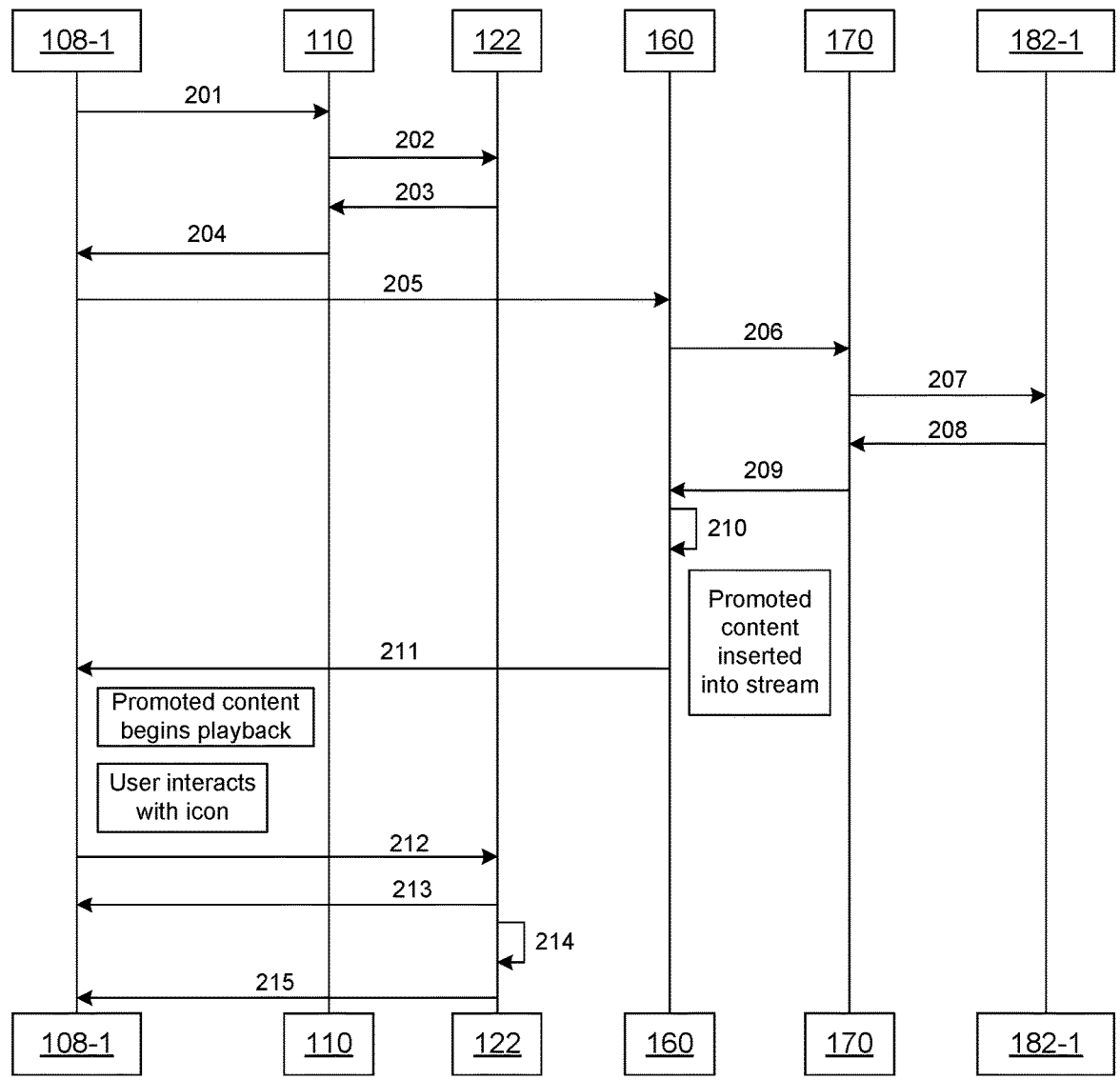
FIG. 2 illustrates a flow diagram depicting example operations of server-side promoted content insertion according to an aspect.

FIG. 2 illustrates an example of a flow diagram 200 depicting server-side insertion using the system 100 of FIGS. 1A through 1E according to an aspect. In operation 201, the streaming application 108-1 transmits a request to retrieve the encrypted token 116 to the access library 110. In operation 202, the access library 110 may invoke the internal service 122 to obtain the user identifier 118 and the signals 120. In operation 203, the internal service 122 transmits the user identifier 118 and the signals 120 to the access library 110. The token generator 114 may generate the token 116a using the user identifier 118 and the signals 120 and encrypt the token 116a to generate the encrypted token 116. In operation 204, the access library 110 returns the encrypted token 116 to the streaming application 108-1. In operation 205, the streaming application 108-1 may transmit the encrypted token 116 to the promoted content server provider 166. In operation 206, the promoted content server provider 166 may generate and send a fetch request 136 to the supply-side platform 170. In operation 207, the supply-side platform 170 may transmit the fetch request 136 to the promoted content server 182-1. In operation 208, the supply-side platform 170 may transmit the promoted content response 138 to the supply-side platform 170.

In operation 209, the supply-side platform 170 may transmit the promoted content response 138 to the promoted content server provider 166. In operation 210, the promoted content server provider 166 may insert the promoted content item 184-1 into the video stream manifest 162. In operation 211, the promoted content server provider 166 transmits the metadata 140 for the control object 144. After operation 211, the streaming application 108-1 may playback the promoted content item 184-1, and the streaming application 108-1 may detect an interaction with the control object 144. In response to detection of the interaction (e.g., select UI control 148), in operation 212, the streaming application 108-1 may transmit a signal 121 to the internal service 122. In operation 213, the internal service 122 may transmit a pause command 123 to the streaming application 108-1. In operation 214, the internal service 122 may obtain control information 125. In operation 215, the internal service 122 may return the control information 125 to the streaming application 108-1.

Figure 3:
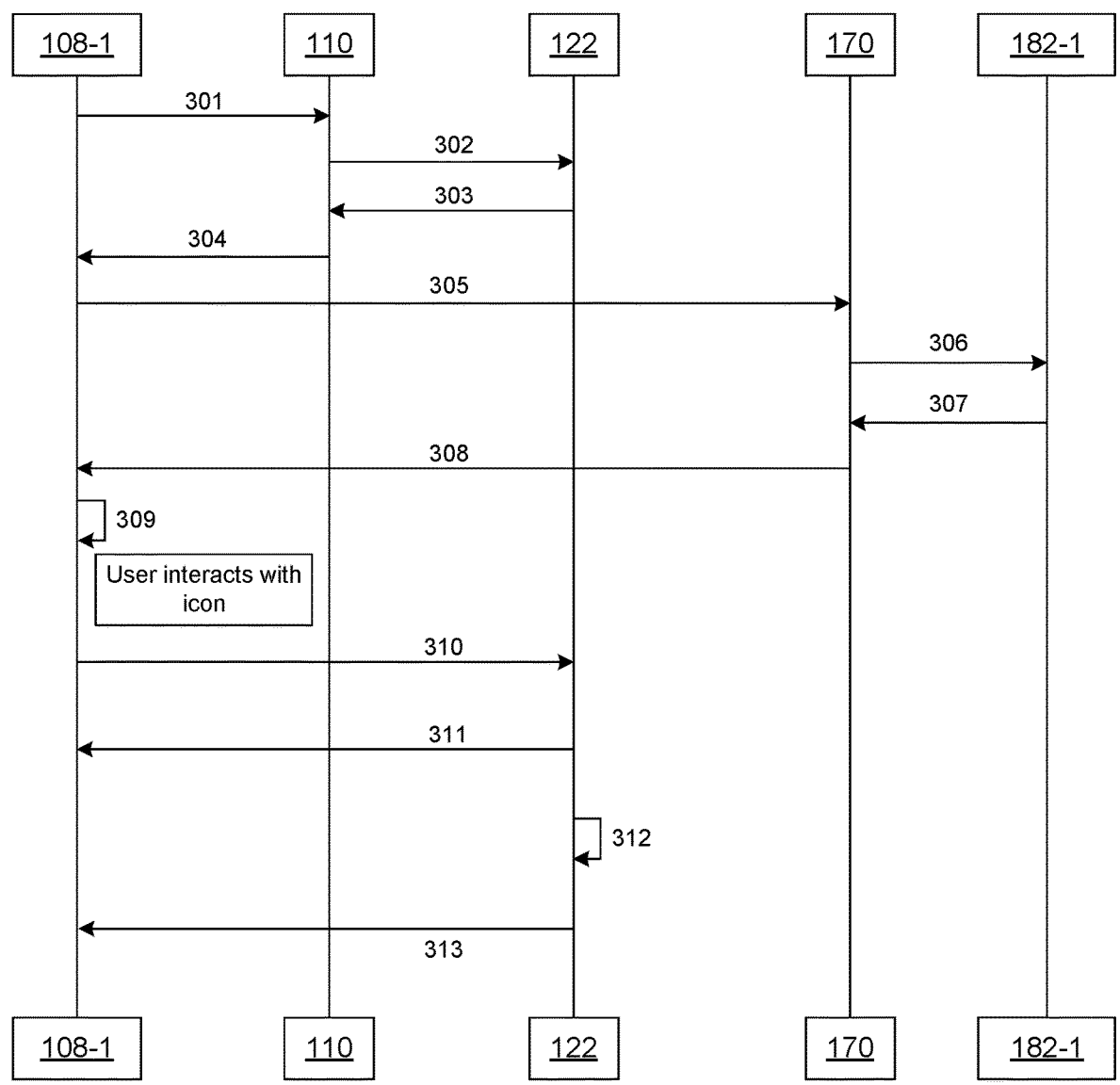
FIG. 3 illustrates a flow diagram depicting example operations of client-side promoted content insertion according to an aspect.

FIG. 3 illustrates an example of a flow diagram 300 depicting client-side insertion using the system 100 of FIGS. 1A through 1E according to an aspect. In operation 301, the streaming application 108-1 transmits a request to retrieve the encrypted token 116 to the access library 110. In operation 302, the access library 110 may invoke the internal service 122 to obtain the user identifier 118 and the signals 120. In operation 303, the internal service 122 transmits the user identifier 118 and the signals 120 to the access library 110. The token generator 114 may generate the token 116a using the user identifier 118 and the signals 120 and encrypt the token 116a to generate the encrypted token 116. In operation 304, the access library 110 returns the encrypted token 116 to the streaming application 108-1. In operation 305, the streaming application 108-1 may transmit a fetch request 136 with the encrypted token 116 to the supply-side platform 170. In operation 306, the supply-side platform 170 may transmit the fetch request 136 to the promoted content server 182-1. In operation 307, the promoted content server 182-1 may transmit the promoted content response 138 to the supply-side platform 170.

In operation 308, the supply-side platform 170 may transmit the promoted content response 138 to the streaming application 108-1. After operation 308, the streaming application 108-1 may playback the promoted content item 184-1, and, in operation 309, the streaming application 108-1 may detect an interaction with the control object 144. In response to detection of the interaction (e.g., select UI control 148), in operation 310, the streaming application 108-1 may transmit a signal 121 to the internal service 122. In operation 311, the internal service 122 may transmit a pause command 123 to the streaming application 108-1. In operation 312, the internal service 122 may obtain control information 125. In operation 313, the internal service 122 may return the control information 125 to the streaming application 108-1.

Figure 4A:
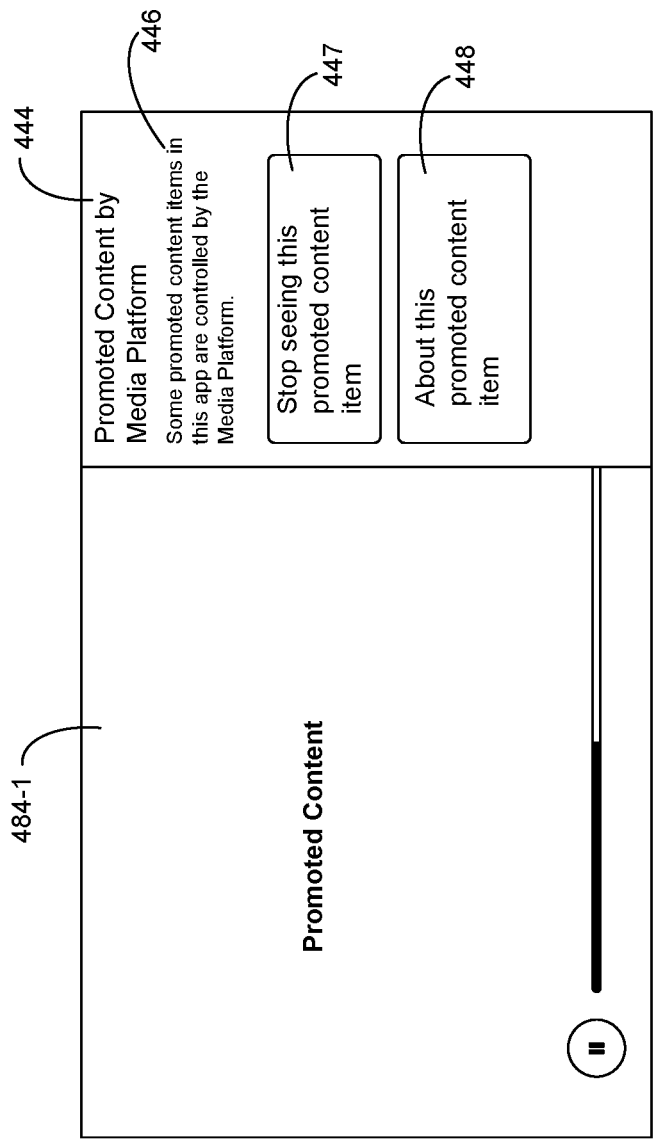
FIG. 4A illustrates an example of a control object according to an aspect.
Figure 4B:
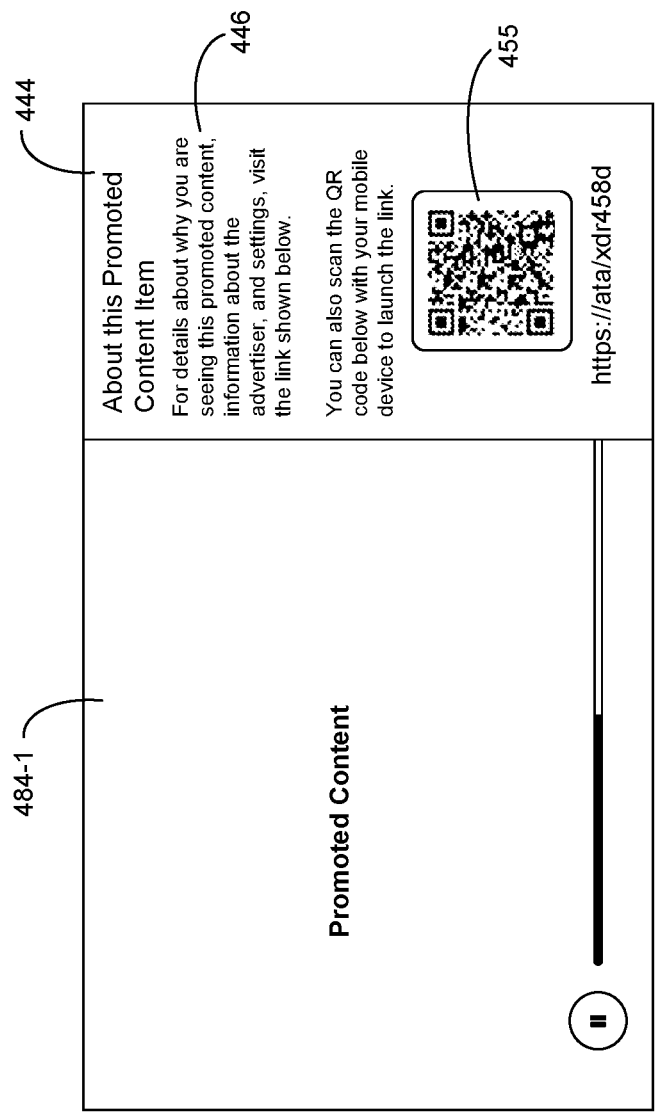
FIG. 4B illustrates an example of a control object according to another aspect.

FIGS. 4A and 4B illustrate examples of a control object 444 according to an aspect. During the display of a promoted content item 484-1, a streaming application may render the control object 444. In some examples, the control object 444 is overlaid on the display of the promoted content item 484-1 (e.g., while the promoted content item 484-1 is being played back). In some examples, the control object 444 includes an ads transparency and controls (ATC) menu. As indicated above, the metadata (e.g., the metadata 140 of FIGS. 1A through 1E) included in the promoted content response or received from the promoted content server provider is used to populate the control object 444. The control object 444 includes explanation data 446 about the promoted content item 484-1. The explanation data 446 may include information on why the user is viewing the promoted content item 484-1.

As shown in FIG. 4A, the control object 144 may include a UI control 447, which, when selected, causes playback of the promoted content item 484-1 to stop. The control object 144 may include a UI control 448, which, when selected, causes the display of further information regarding the display of promoted contents. In response to the UI control 448 being selected, as shown in FIG. 4B, the streaming application may update the control object 444 to display a machine-readable barcode 455 (e.g., QR code) associated with a promoted content setting interface. The machine-readable barcode is configured to be captured by a camera on a mobile device, which causes the mobile device to render the promoted content setting interface, where the user can adjust their promoted content settings. In some examples, the streaming application may transmit a signal (e.g., signal 121 of FIGS. 1A through 1E) via API(s) to the operating system, where the operating system may cause the streaming application to pause the display of the promoted content item 484-1. Also, the operating system may return the machine-readable barcode 455, which is displayed in the control object 444.

Figure 5:
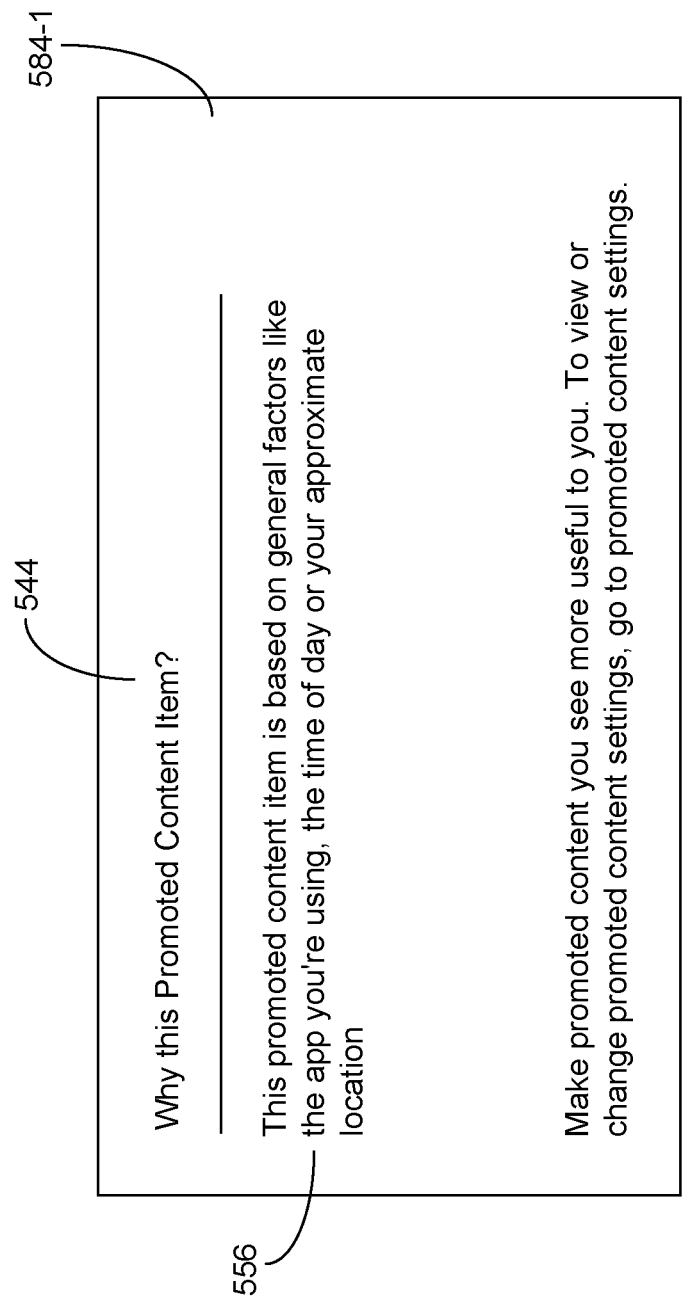
FIG. 5 illustrates an example of a control object according to another aspect.

FIG. 5 illustrates an example of a control object 544 according to an aspect. During the display of a promoted content item 584-1, a streaming application may render the control object 544. In some examples, the control object 544 is overlaid on the display of the promoted content item 584-1 (e.g., while the promoted content item 584-1 is being played back). In some examples, the control object 544 includes an ads transparency and controls (ATC) menu. As indicated above, the metadata (e.g., the metadata 140 of FIGS. 1A through 1E) included in the promoted content response or received from the promoted content server provider is used to populate the control object 544. The control object 544 includes explanation data 546 about the promoted content item 584-1. The explanation data 546 may include information on why the user is viewing the promoted content item 584-1. In some examples, the control object 544 does not include one or more controls.

Figure 6:
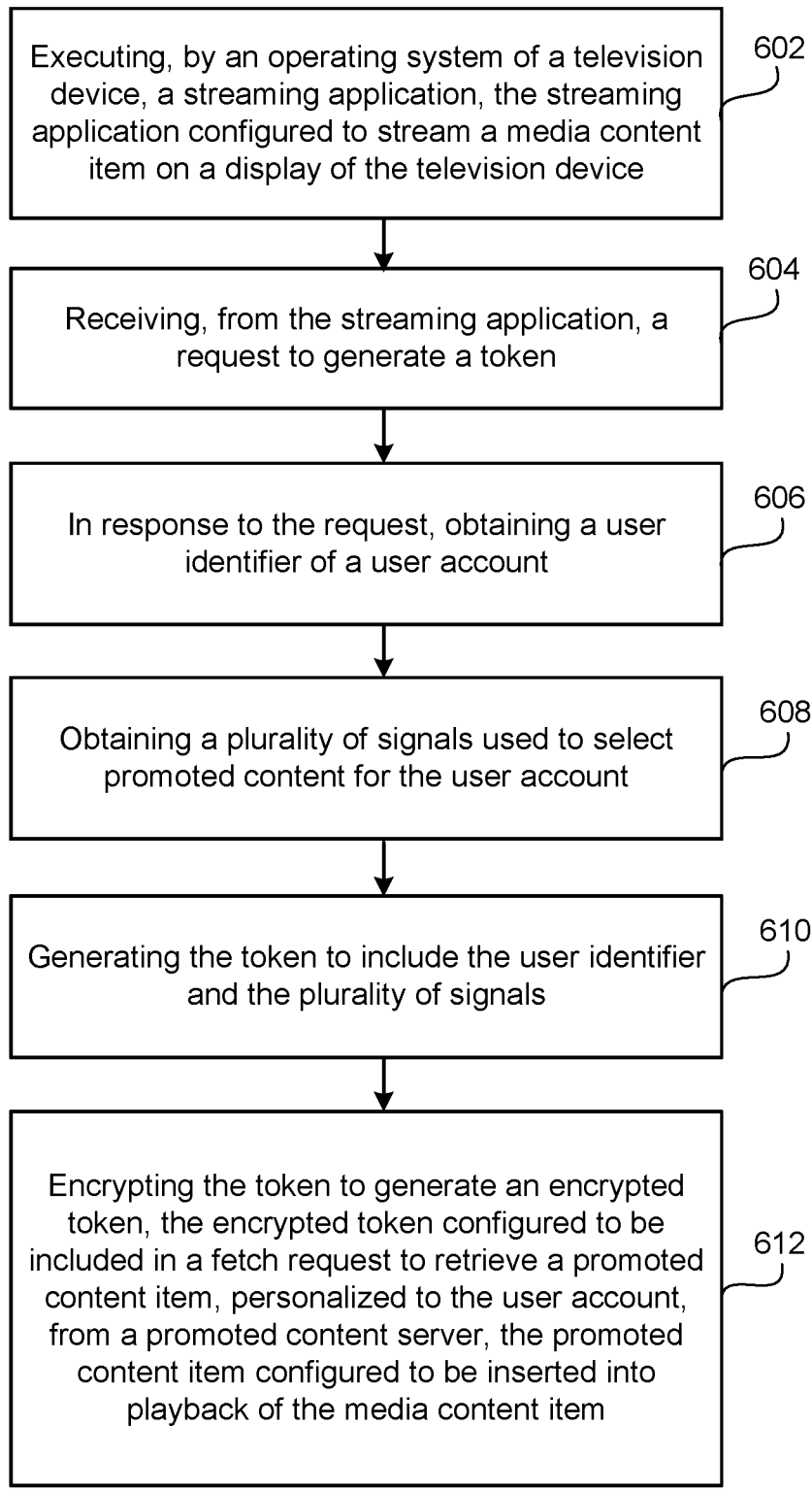
FIG. 6 illustrates a flowchart depicting example operations of a promoted content framework according to an aspect.

FIG. 6 illustrates a flowchart 600 depicting example operations of sharing of promoted content from multiple promoted content servers for media content rendered by a streaming application executable by an operating system of a device. The operations may be implemented in a server-side insertion mechanism or a client-side insertion mechanism. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion. The operations may define a method (e.g., a computer-implemented method). Although the flowchart 600 is described with reference to the system 100 of FIGS. 1A through 1E, the flowchart 600 may be executed according to any of the figures discussed herein. In some examples, the operations are executed by an operating system of a television device. In some examples, the operations are executed by an operating system of a television device and a supply-side platform.

Operation 602 includes executing, by an operating system 105 of a television device (e.g., device 102), a streaming application 108-1. The streaming application 108-1 is configured to stream a media content item 128-1 on a display 124 of the television device. Operation 604 includes receiving, from the streaming application 108-1, a request to generate a token. Operation 606 includes, in response to the request, obtaining a user identifier 118 of a user account 104 of a media platform 152. Operation 608 includes obtaining a plurality of signals 120 used to select promoted content for the user account 104. Operation 610 includes generating the token 116a to include the user identifier 118 and the plurality of signals 120. Operation 612 includes encrypting the token 116a to generate an encrypted token 116. The encrypted token 116 is configured to be included in a fetch request 136 to retrieve a promoted content item 184-1, personalized to the user account 104, from a promoted content server 182-1. The promoted content item 184-1 is configured to be inserted into playback of the media content item 128-1.

In some examples, the operations of the flowchart 600 include SSAI operations in which a promoted content server provider 166 retrieves a video stream manifest 162 from the streaming platform 160-1 and promoted content items 184-1, 184-2 selected by the first and second promoted content servers (e.g., promoted content server 182-1, promoted content server 182-2). The video stream manifest 162 may include the media content (e.g., video) of the media content item 128-1. The promoted content server provider 166 may adjust the video stream manifest 162 to identify the locations in the timeline of the video stream to insert the appropriate promoted content items 184-1, 184-2 selected by the first and second promoted content servers 182-1, 182-2. The streaming application 108-1 may receive the video stream manifest 162 from the promoted content server provider 166 and display the promoted content items 184-1, 184-2 at the times specified by the video stream manifest 162.

In some examples, the operations of the flowchart 600 include CSAI operations in which the streaming application 108-1 retrieves a promoted content item from one of the promoted content servers 182-1, 182-2 and inserts the promoted content item into the video stream. For example, after playback of the media content item 128-1 is initiated, the streaming application 108-1 may detect a promoted content insertion event, e.g., a point in the video stream to insert promoted content. Upon detection of a promoted content insertion event, the streaming application 108-1 may generate and transmit a token request to the token generator 114 via the API(s) 112. In response to the token request, the token generator 114 may generate the encrypted token 116 and transmit the encrypted token 116 back to the streaming application 108-1.

In some examples, the operations may include receiving, from the streaming application, a signal that indicates user interaction with a control object rendered on the promoted content item, and in response to the signal, generating a pause command configures to cause the streaming application to pause playback of the promoted content item. In some examples, in response to the signal, the operations include transmitting, to the streaming application, control information to be rendered in the control object. The control information may include a resource locator associated with a promoted content setting interface associated with the media platform. The resource locator may include a machine-readable barcode. The promoted content server may be a first promoted content server, and the operations may include receiving, at a supply-side platform, the fetch request with the encrypted token, selecting the first promoted content server from a plurality of promoted content servers, the plurality of promoted content servers including a second promoted content server associated with the streaming application, and transmitting the fetch request with the encrypted token to the first promoted content server. The fetch request may be received from a promoted content server provider associated with the streaming application. The fetch request may be received from the streaming application.

In some examples, the operations may include receiving, at the first promoted content server, the fetch request with the encrypted token, decrypting the encrypted token to obtain the plurality of signals and the user identifier, selecting the promoted content item from a promoted content inventory of the first promoted content server based on the plurality of signals and the user identifier, and transmitting a promoted content response to the supply-side platform, the promoted content response identifying the promoted content item and including metadata about the promoted content item. In some examples, the metadata includes control information to be rendered in a control object configured to be displayed during playback of the promoted content item. In some examples, the promoted content response includes a video ad serving template (VAST) format. In some examples, the operations may include transmitting, by the supply-side platform, the promoted content response to a promoted content server provider associated with the streaming application, the promoted content server provider configured to insert the promoted content item into a video stream manifest. In some examples, the operations may include transmitting, by the supply-side platform, the promoted content response to the streaming application, the streaming application to insert the promoted content item into the playback of the media content item.

Figure 7:
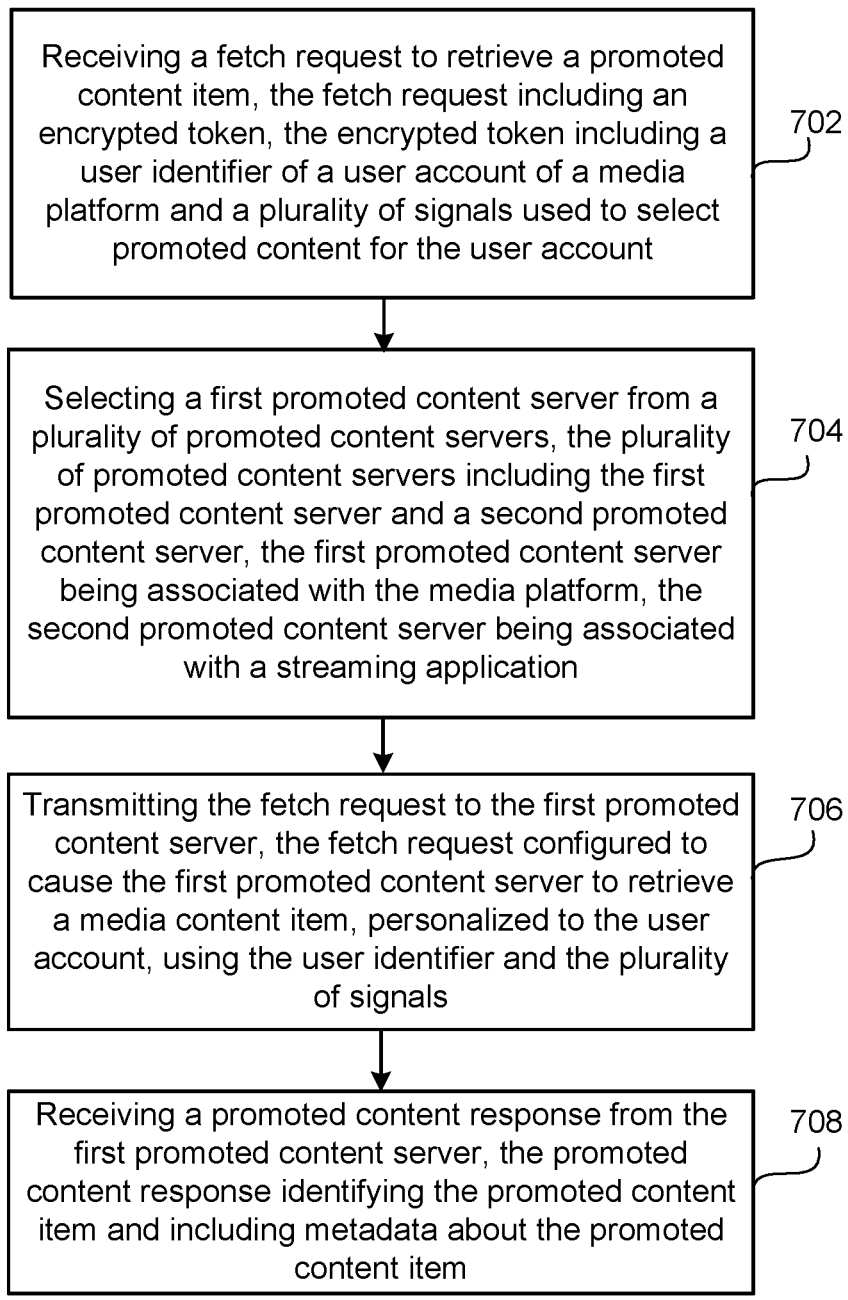
FIG. 7 illustrates a flowchart depicting example operations of a promoted content framework according to another aspect.

FIG. 7 illustrates a flowchart 700 depicting example operations of sharing of promoted content from multiple promoted content servers for media content rendered by a streaming application executable by an operating system of a device. The operations may be implemented in a server-side insertion mechanism or a client-side insertion mechanism. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. The operations may define a method (e.g., a computer-implemented method). Although the flowchart 700 is described with reference to the system 100 of FIGS. 1A through 1E, the flowchart 700 may be executed according to any of the figures discussed herein. In some examples, the operations are executed by a supply-side platform.

Operation 702 includes receiving a fetch request 136 to retrieve a promoted content item. The fetch request 136 includes an encrypted token 116. The encrypted token includes a user identifier 118 of a user account 104 of a media platform 152 and a plurality of signals 120 used to select promoted content for the user account 104. Operation 704 includes selecting a first promoted content server (e.g., promoted content server 182-1) from a plurality of promoted content servers (e.g., promoted content server 182-1, promoted content server 182-2). The plurality of promoted content servers includes the first promoted content server (e.g., promoted content server 182-1) and a second promoted content server (e.g., promoted content server 182-2). The first promoted content server is associated with the media platform 152. The second promoted content server is associated with a streaming application 108-1. Operation 706 includes transmitting the fetch request 136 to the first promoted content server. The fetch request 136 is configured to cause the first promoted content server to retrieve a media content item 184-1, personalized to the user account 104, using the user identifier 118 and the plurality of signals 120. Operation 708 includes receiving a promoted content response 138 from the first promoted content server. The promoted content response 138 identifies the promoted content item 184-1 and includes metadata 140 about the promoted content item 184-1.

In some examples, the fetch request is received from a promoted content server provider associated with the streaming application. In some examples, the fetch request is received from the streaming application. In some examples, the operations include transmitting the promoted content response to a promoted content server provider associated with the streaming application, the promoted content server provider configured to insert the promoted content item into a video stream manifest. The metadata may include control information to be rendered in a control object configured to be displayed during playback of the promoted content item. In some examples, the operations include transmitting the promoted content response to the streaming application, the streaming application to insert the promoted content item into playback of the media content item.

In some aspects, the techniques described herein relate to a television device including: at least one processor; and a non-transitory computer-readable medium storing executable instructions that when executed by the at least one processor cause the at least one processor to: execute, by an operating system of the television device, a streaming application configured to stream a media content item on a display of the television device; receive, from the streaming application, a request to generate a token; in response to the request, obtain a user identifier of a user account of a media platform; obtain a plurality of signals used to select promoted content for the user account; generate the token to include the user identifier and the plurality of signals; and encrypt the token to generate an encrypted token, the encrypted token configured to be included in a fetch request to retrieve a promoted content item, personalized to the user account, from a promoted content server associated with the media platform, the promoted content item configured to be inserted into playback of the media content item by the streaming application.

In some aspects, the techniques described herein relate to a television device, wherein the executable instructions include instructions that cause the at least one processor to: receive, from the streaming application, a signal that indicates user interaction with a control object rendered on the promoted content item; in response to the signal, generate a pause command configured to cause the streaming application to pause playback of the promoted content item; and transmit, to the streaming application, control information to be rendered in the control object. In some aspects, the techniques described herein relate to a television device, wherein the control information includes a resource locator associated with a promoted content setting interface associated with the media platform. the resource locator including a machine-readable barcode.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
   executing, by an operating system of a streaming device, a streaming application configured to stream a media content item on a display of the streaming device;
   in response to receiving, from the streaming application, a request to generate a token:
      obtaining a user identifier of a user account of a media platform;
      obtaining, by the operating system, a plurality of signals used to select promoted content for the user account;
      generating, by the operating system, the token to include the user identifier and the plurality of signals; and
      encrypting the token to generate an encrypted token, the encrypted token configured to be included in a fetch request to retrieve a promoted content item, personalized to the user account, from a promoted content server associated with the media platform, the promoted content item configured to be inserted into playback of the media content item by the streaming application.

2. The method of claim 1, further comprising:
   receiving, from the streaming application, a signal that indicates user interaction with a control object rendered on the promoted content item; and
   in response to the signal, generating a pause command configured to cause the streaming application to pause playback of the promoted content item.

3. The method of claim 2, further comprising:
   in response to the signal, transmitting, to the streaming application, control information to be rendered in the control object.

4. The method of claim 3, wherein the control information includes a resource locator associated with a promoted content setting interface associated with the media platform.

5. The method of claim 4, wherein the resource locator includes a machine-readable barcode.

6. The method of claim 1, wherein the promoted content server is a first promoted content server, the method further comprising:
   receiving, at a supply-side platform, the fetch request with the encrypted token;
   selecting the first promoted content server from a plurality of promoted content servers, the plurality of promoted content servers including a second promoted content server associated with the streaming application; and
   transmitting the fetch request with the encrypted token to the first promoted content server.

7. The method of claim 6, wherein the fetch request is received from a promoted content server provider associated with the streaming application.

8. The method of claim 6, wherein the fetch request is received from the streaming application.

9. The method of claim 6, further comprising:
   receiving, at the first promoted content server, the fetch request with the encrypted token;
   decrypting the encrypted token to obtain the plurality of signals and the user identifier;
   selecting the promoted content item from a promoted content inventory of the first promoted content server based on the plurality of signals and the user identifier; and
   transmitting a promoted content response to the supply-side platform, the promoted content response identifying the promoted content item and including metadata about the promoted content item.

10. The method of claim 9, wherein the metadata includes control information to be rendered in a control object configured to be displayed during playback of the promoted content item.

11. The method of claim 9, wherein the promoted content response includes a video ad serving template (VAST) format.

12. The method of claim 9, further comprising:
    transmitting, by the supply-side platform, the promoted content response to a promoted content server provider associated with the streaming application, the promoted content server provider configured to insert the promoted content item into a video stream manifest.

13. The method of claim 9, further comprising:
    transmitting, by the supply-side platform, the promoted content response to the streaming application, the streaming application to insert the promoted content item into the playback of the media content item.

14. A non-transitory computer-readable medium storing executable instructions that when executed by at least one processor cause the at least one processor to execute operations, the operations comprising:
    receiving a fetch request to retrieve a promoted content item, the fetch request including an encrypted token, the encrypted token being generated at an operating system of a streaming device, the streaming device executing a streaming application, the encrypted token including a user identifier of a user account of a media platform and a plurality of signals used to select promoted content for the user account;
    selecting a first promoted content server from a plurality of promoted content servers, the plurality of promoted content servers including the first promoted content server and a second promoted content server, the first promoted content server being associated with the media platform, the second promoted content server being associated with the streaming application; and transmitting the fetch request to the first promoted content server, the fetch request configured to cause the first promoted content server to retrieve a media content item, personalized to the user account, using the user identifier and the plurality of signals; and receiving a promoted content response from the first promoted content server, the promoted content response identifying the promoted content item and including metadata about the promoted content item.

15. The non-transitory computer-readable medium of claim 14, wherein the fetch request is received from a promoted content server provider associated with the streaming application.

16. The non-transitory computer-readable medium of claim 14, wherein the fetch request is received from the streaming application.

17. The non-transitory computer-readable medium of claim 14, wherein the operations further comprise:

transmitting the promoted content response to a promoted content server provider associated with the streaming application, the promoted content server provider configured to insert the promoted content item into a video stream manifest.

18. The non-transitory computer-readable medium of claim 14, wherein the metadata includes control information to be rendered in a control object configured to be displayed during playback of the promoted content item.

19. The non-transitory computer-readable medium of claim 14, wherein the operations further comprise:

transmitting the promoted content response to the streaming application, the streaming application to insert the promoted content item into playback of the media content item.

20. A television device comprising:

at least one processor; and a non-transitory computer-readable medium storing executable instructions that when executed by the at least one processor cause the at least one processor to:

execute, by an operating system of the television device, a streaming application configured to stream a media content item on a display of the television device;

in response to receiving, from the streaming application, a request to generate a token:

obtain a user identifier of a user account of a media platform;

obtain a plurality of signals used to select promoted content for the user account;

generate the token to include the user identifier and the plurality of signals; and encrypt the token to generate an encrypted token, the encrypted token configured to be included in a fetch request to retrieve a promoted content item, personalized to the user account, from a promoted content server associated with the media platform, the promoted content item configured to be inserted into playback of the media content item by the streaming application.

21. The television device of claim 20, wherein the executable instructions include instructions that cause the at least one processor to:

receive, from the streaming application, a signal that indicates user interaction with a control object rendered on the promoted content item;

in response to the signal, generate a pause command configured to cause the streaming application to pause playback of the promoted content item; and transmit, to the streaming application, control information to be rendered in the control object.

22. The television device of claim 21, wherein the control information includes a resource locator associated with a promoted content setting interface associated with the media platform the resource locator including a machine-readable barcode.

* * * * *